US012637196B2

(12) United States Patent
Forehand et al.

(10) Patent No.: US 12,637,196 B2
(45) Date of Patent: May 26, 2026

(54) SYSTEMS AND METHODS FOR PROTECTING SURFACES OF COMPONENTS WITHIN AN INTERNAL CABIN OF A VEHICLE

(71) Applicant: THE BOEING COMPANY, Chicago, IL (US)

(72) Inventors: Aaron M. Forehand, Snohomish, WA (US); Petros G. Djiovanis, Everett, WA (US); Harold Samuel Phipps, Lake Forest Park, WA (US); Jeffrey Lee Kelsey, Snohomish, WA (US); Nicole Delores Fellows, Seattle, WA (US)

(73) Assignee: The Boeing Company, Arlington, VA (US)

( * ) Notice: Subject to any disclaimer, the term of this patent is extended or adjusted under 35 U.S.C. 154(b) by 213 days.

(21) Appl. No.: 18/152,204

(22) Filed: Jan. 10, 2023

(65) Prior Publication Data

US 2024/0228009 A1     Jul. 11, 2024

(51) Int. Cl.
*B64C 1/06*        (2006.01)
*B64F 5/10*        (2017.01)

(52) U.S. Cl.
CPC ............... *B64C 1/066* (2013.01); *B64F 5/10* (2017.01)

(58) Field of Classification Search
CPC ..................................................... B64C 1/066
See application file for complete search history.

(56) References Cited

U.S. PATENT DOCUMENTS

| | | | | |
|---|---|---|---|---|
| 2,142,194 A | * | 1/1939 | Karfiol | G09F 3/10 206/820 |
| 3,185,197 A | * | 5/1965 | Spiro | A47C 31/10 428/33 |
| 4,142,565 A | * | 3/1979 | Plunkett, Sr. | F16L 59/026 150/156 |
| 4,708,183 A | * | 11/1987 | Figueroa | F16B 2/12 248/231.71 |
| 4,974,384 A | * | 12/1990 | Pacione | E04G 9/02 52/483.1 |
| 5,133,166 A | * | 7/1992 | Pacione | E04G 11/50 52/250 |
| 5,255,727 A | * | 10/1993 | Saruwatari | E06B 7/28 206/321 |
| 5,287,614 A | * | 2/1994 | Ehrlich | A47G 11/006 5/493 |
| 5,560,683 A | * | 10/1996 | Penley | B64D 11/0647 297/452.56 |
| 5,664,832 A | * | 9/1997 | Stevens | A47C 31/11 297/228.11 |
| 5,707,032 A | * | 1/1998 | Ehrlich | A47G 11/006 248/300 |

(Continued)

FOREIGN PATENT DOCUMENTS

| | | | | |
|---|---|---|---|---|
| EP | 2270292 A1 | * | 1/2011 | E04F 15/02 |
| EP | 3936675 | | 1/2022 | |
| FR | 2923773 A1 | * | 5/2009 | B60N 2/449 |

*Primary Examiner* — Joshua K Ihezie
(74) *Attorney, Agent, or Firm* — Joseph M. Butscher; Carroll, Hoette & Butscher, LLC

(57) ABSTRACT

A system and a method for protecting one or more surfaces of one or more components within an internal cabin of a vehicle include panels configured to removably couple together in relation to the one or more surfaces of the one or more components.

19 Claims, 11 Drawing Sheets

(56)                    References Cited

U.S. PATENT DOCUMENTS

| | | | |
|---|---|---|---|
| 5,996,190 | A * | 12/1999 | Peterson .............. A47G 21/167 |
| | | | 24/523 |
| 7,934,894 | B1 * | 5/2011 | Temple .................. B65D 71/02 |
| | | | 410/97 |
| 8,464,493 | B2 | 6/2013 | Bartley |
| 9,512,670 | B2 * | 12/2016 | Forbis ....................... E04B 1/80 |
| 10,011,368 | B1 * | 7/2018 | Parks ..................... B64D 45/00 |
| 10,215,539 | B2 | 2/2019 | White |
| 11,149,452 | B2 * | 10/2021 | Rus ......................... E04G 21/30 |
| 11,293,193 | B2 * | 4/2022 | Rus ....................... E04F 11/163 |
| 11,479,334 | B2 * | 10/2022 | Pirner ....................... B32B 7/06 |
| 2006/0145005 | A1 * | 7/2006 | Drost ..................... B64C 1/066 |
| | | | 244/118.5 |
| 2008/0066389 | A1 * | 3/2008 | Siegel ............... A47G 27/0287 |
| | | | 52/3 |
| 2009/0133354 | A1 | 5/2009 | Spear |
| 2011/0005695 | A1 | 1/2011 | Bartley |
| 2013/0122244 | A1 * | 5/2013 | Patel ................. B29D 99/0021 |
| | | | 156/196 |
| 2017/0291725 | A1 * | 10/2017 | Abelon ..................... B64F 5/50 |
| 2018/0065728 | A1 * | 3/2018 | Boyer, Jr. .............. B64C 1/066 |
| 2019/0009929 | A1 * | 1/2019 | Guering ................... B64C 1/40 |
| 2020/0001967 | A1 * | 1/2020 | Pirner ....................... B32B 5/18 |
| 2021/0078709 | A1 * | 3/2021 | Scoley .............. B64D 11/0023 |
| 2022/0244021 | A1 * | 8/2022 | Malone ................. F41H 5/013 |

* cited by examiner

SYSTEMS AND METHODS FOR PROTECTING SURFACES OF COMPONENTS WITHIN AN INTERNAL CABIN OF A VEHICLE

FIELD OF THE DISCLOSURE

Examples of the present disclosure generally relate to systems and methods for protecting surfaces of components within an internal cabin of a vehicle, such as a commercial aircraft.

BACKGROUND OF THE DISCLOSURE

As a commercial aircraft is being manufactured, various components are installed within an internal cabin. For example, flooring, interior walls, seats, monuments (such as lavatories, closets, galleys, and the like) are installed within an internal cabin. As additional components are installed, previously installed components can be susceptible to damage. For example, additional seat assemblies being moved into an internal cabin can potentially contact various surfaces of components already secured within the internal cabin. Additionally, as various components are being installed, tools and fasteners that are used to secure the components in place can potentially contact surfaces of the components.

SUMMARY OF THE DISCLOSURE

A need exists for a system and a method for protecting surfaces of components within an internal cabin of a vehicle, such as during a manufacturing process.

With that need in mind, certain examples of the present disclosure provide a system for protecting one or more surfaces of one or more components within an internal cabin of a vehicle. The system includes panels configured to removably couple together in relation to the one or more surfaces of the one or more components.

In at least one example, each of the panels includes a first face, a second face opposite from the first face, one or more first coupling members secured to the first face, and one or more second coupling members secured to the second face. In at least one further example, the one or more first coupling members include loops, and the one or more second coupling members include hooks. In at least one example, the loops are configured to face toward the one or more surfaces of the one or more components, and the hooks are configured to face away from the one or more surface of the one or more components.

In at least one example, the panels include main bodies formed of plastic. The panels can include main bodies formed of polyethylene.

In at least one example, at least two of the panels differ in one or more of size or shape. In at least one example, at least two of panels have different thicknesses.

In at least one example, the panels include internal braces between a first face and a second face that is opposite from the first face.

In at least one example, the system also includes corner joints configured to removably secure to each of the panels. The corner joints can include coupling members configured to removably couple to one or more complementary coupling members of the panels. Each of the corners joints can include a first wall, and a second wall connected to the first wall at an angle. The coupling members outwardly extend from outer surfaces of the first wall and the second wall.

Cushions can inwardly extend from inner surfaces of the first wall and the second wall.

In at least one example, the system also includes clips configured to removably secure to each of the panels. The clips can include coupling members configured to removably couple to one or more complementary coupling members of the panels.

The panels can include one or more openings.

Certain examples of the present disclosure provide a method for protecting one or more surfaces of one or more components within an internal cabin of a vehicle. The method includes removably coupling panels together in relation to the one or more surfaces of the one or more components. The method can also include removably securing corner joints to the panels. The method can also include removably securing clips configured to the panels.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide a system for protecting surfaces of components within an internal cabin of a vehicle, such as during a manufacturing process. The system includes a plurality of panels that can be modularly coupled together on and around the components. The panels include coupling members, such as hook and loop fasteners, that are configured to secure to coupling members of other panels to provide a modular protective barrier that can be sized and shaped as desired.

Figure 1:
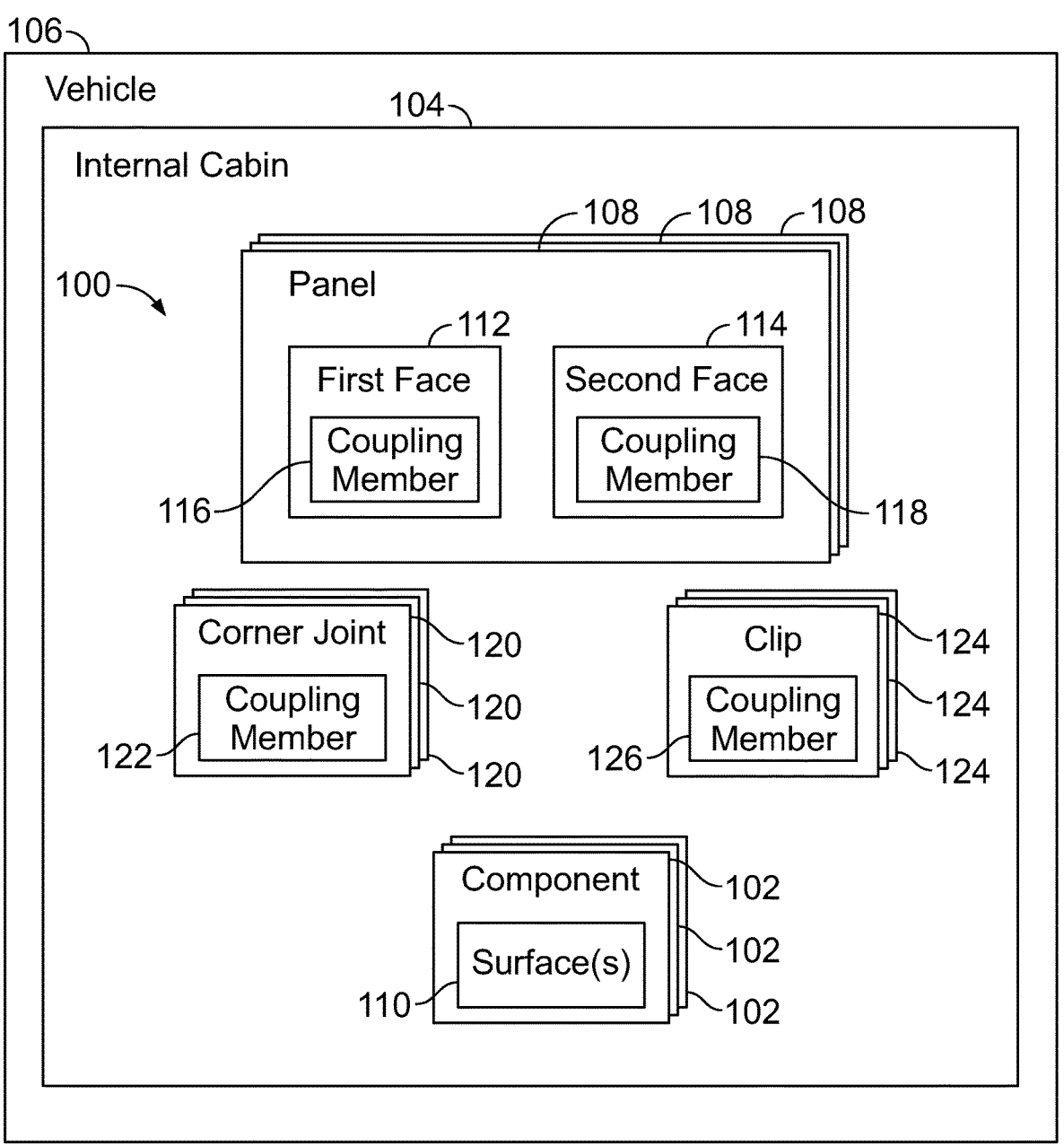
FIG. 1 illustrates a block diagram of a system for protecting components within an internal cabin of a vehicle, according to an example of the present disclosure.

FIG. 1 illustrates a block diagram of a system 100 for protecting components 102 within an internal cabin 104 of a vehicle 106, according to an example of the present disclosure. In at least one example, the vehicle 106 is an aircraft, such as a commercial jet or airplane. As another example, the vehicle 106 can be an automobile, a bus, a train car, a watercraft, a spacecraft, or the like. In at least one other example, the system 100 can be used with respect to fixed structures, such as residential or commercial buildings as they are being built. The system 100 can be used to protect the components 102 as the vehicle 106 is being manufactured.

The components 102 include floors, interior walls, ceilings, seats, monuments (such as lavatories, closets, galleys, etc.), and/or the like. The internal cabin 104 can include numerous components 102. The system 100 includes modular pieces that can be selectively secured together to form a protective barrier in relation to the components 102.

The system 100 includes a plurality of panels 108 that are configured to removably couple together in relation to one or more surfaces 110 of one or more of the components 102 to provide a protective barrier in relation to the surface(s) 110. The panels 108 includes a first face 112 (such as a front or rear exposed planar surface) and a second face 114 (such as a rear or front exposed planar surface), which is opposite from the first face 112. The first face 112 includes a coupling member 116, and the second face 114 includes a coupling member 118. The coupling member 116 and the coupling member 118 are complementary to one another. For example, the coupling member 116 can be a plurality of hooks or loops, and the coupling member 118 can be the other of the plurality of hooks or loops. As another example, the coupling member 116 can be one or magnets, and the coupling member 118 can be complementary magnetic metal strips. As another example, the coupling member 116 and the coupling member 118 can be a rail and channel, respectively. As another example, the coupling member and the coupling member 118 can be snaps and reciprocal retainers, respectively.

The coupling member 116 of the first face 112 of one panel 108 is configured to removably secure to a coupling member 118 of another panel 108. Because a single panel 108 includes a coupling member 116 and a coupling member 118, the coupling members 116 and 118 of that single panel 108 do not couple to one another. Instead, the coupling members 116 of a panel 108 are configured to removably secure to coupling members 118 of a different panel 108. Likewise, the coupling members 118 of a panel 108 are configured to removably secure to coupling members 116 of a different panel 108. The panels 108 can be disposed around the surface(s) 110 of the component(s) 102 and secured together via the complementary coupling members 116 and 118 to provide a protective barrier in relation to the surface(s) 110.

In at least one example, the panels 108 include main bodies formed of a plastic, such as polyethylene. It has been found that panels 108 formed of polyethylene provide a robust protective barrier, while also being light and easily maneuverable. Optionally, the panels 108 can be formed of a metal. As another option, the main bodies of the panels 108 can be formed of other types of polymers, ceramics, and/or a metal, such as aluminum.

The panels 108 can be sized and shaped the same. Optionally, the panels 108 can be sized and shaped differently. In at least one example, a first subset of panels 108 can have a first common size and shape, and a second subset of panels 108 can be a second common size and shape that differs from the first common size and shape. The system 100 can include additional subsets of panels 108 having different sizes and shapes.

In at least one example, the system 100 also includes corner joints 120. The corner joints 120 include coupling members 122 that are configured to removably secure to one or both of the coupling member 116 and/or the coupling member 118. For example, the coupling members 122 can be hooks or loops. The corner joints 120 can be angled beams that are configured to secure different panels 108 together at an angled orientation. For example, the coupling members 122 can be right angle beams that are configured to removably connect a first panel 108 to a second panel 108 at a right angle. Optionally, the coupling members 122 can have a different angular orientation than a right angle. Alternatively, the system 100 does not include the corner joints 120. Instead, different panels 108 can be removably secured together at angular orientations, such as through tape.

In at least one example, the system 100 also include clips 124, which include coupling members 126 that are configured to removably secure to one or both of the coupling member 116 and/or the coupling member 118. The clips 124 can be configured to removably secure panels 108 to portions of components 102, and/or other panels 108. The clips 124 can be fixed C clips, for example, Optionally, the clips 124 can be adjustable ratchet clips. As another example, the clips 124 include flexible straps that can be secured around portions of the components 102 and/or other panels 108. Alternatively, the system 100 does not include the clips 124.

As described herein, the system 100 for protecting one or more surfaces 110 of one or more components 102 within the internal cabin 104 of the vehicle includes panels 108 configured to removably couple together in relation to the one or more surfaces 110 of the one or more components 102. The system 100 can also include the corner joints 120 and/or the clips 124. Each of the panels 108 includes a first face 112, a second face 114 opposite from the first face 112, one or more first coupling members 116 secured to the first face 112, and one or more second coupling members 118 secured to the second face 114. The first coupling members 116 are configured to removably couple to second coupling members 116 of other panels 108, coupling members 122 of the corner joints 120, and the coupling members 126 of the clips 124. The second coupling members 118 are configured to removably couple to first coupling members 116 of other panels 108, for example. The first coupling members 116 can be loops, and the second coupling members 118 can be hooks.

Figure 2:
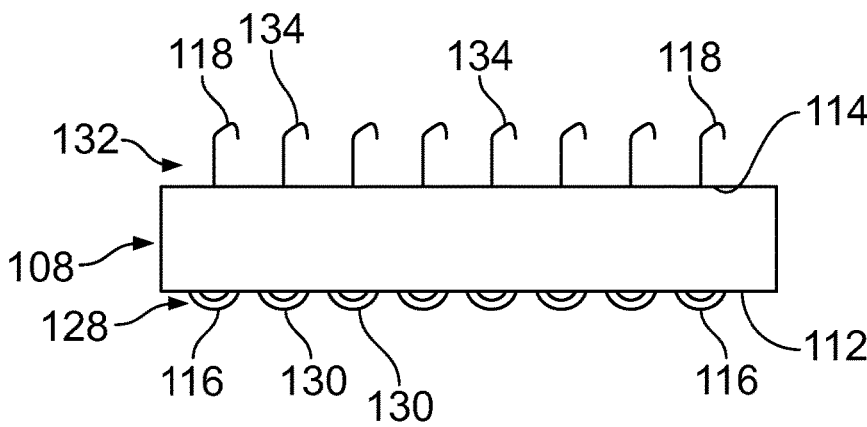
FIG. 2 illustrates a simplified top edge view of a panel, according to an example of the present disclosure.

FIG. 2 illustrates a simplified top edge view of a panel 108, according to an example of the present disclosure. In at least one example, the coupling member 116 includes one or more loop groups 128 that includes a plurality of loops 130. The coupling member 118 includes one or more hook groups 132 that include a plurality of hooks 134. The hooks 134 of the panel 108 are configured to selectively mate with loops 130 of another panel 108 (and/or the loops of a coupling member 122 of a corner joint 120 and/or the loops of a coupling member 126 of a clip 124, shown in FIG. 1). The loops 130 of the panel 108 are configured to selectively mate with hooks 134 of another panel (and/or the hooks of a coupling member 122 of a corner joint 120 and/or the hooks of a coupling member 126 of a clip 124).

Figure 3:
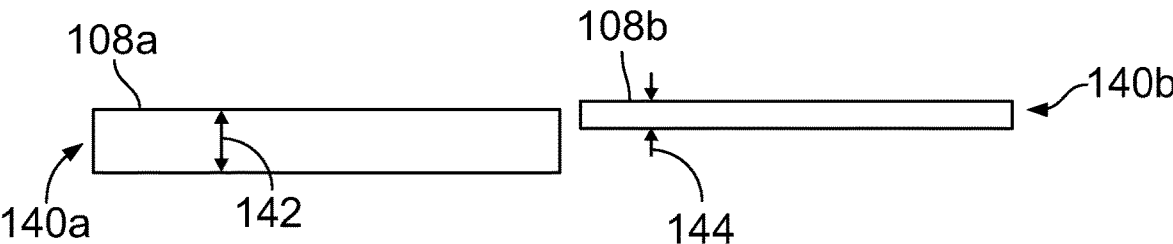
FIG. 3 illustrates simplified top edge views of main bodies of panels, according to an example of the present disclosure.

FIG. 3 illustrates simplified top edge views of main bodies 140a and 140b of respective panels 108a and 108b, according to an example of the present disclosure. The main bodies 140a and 140b can be integrally molded and formed as a monolithic piece of plastic, such as polyethylene. Optionally, the main bodies 140a and 140b can be formed of other plastics, metals, or composite materials. As shown the main body 140a has a first thickness 142, and the main body 140b has a second thickness 144 that differs from the first thickness 142. The first thickness 142 is greater than the second thickness 144. As such, the main body 140a can provide a more robust barrier than the main body 140b. However, because the main body 140b is less thick than the main body 140a, the main body 140b is more flexible and is able to bend and curve around surfaces easier than the main body 140a. As a non-limiting example, the thickness 142 can be 8-10 millimeters (mm), and the thickness 144 can be 4-5 mm. Optionally, the thicknesses 142 and 144 can be greater or less than noted.

Figure 4:
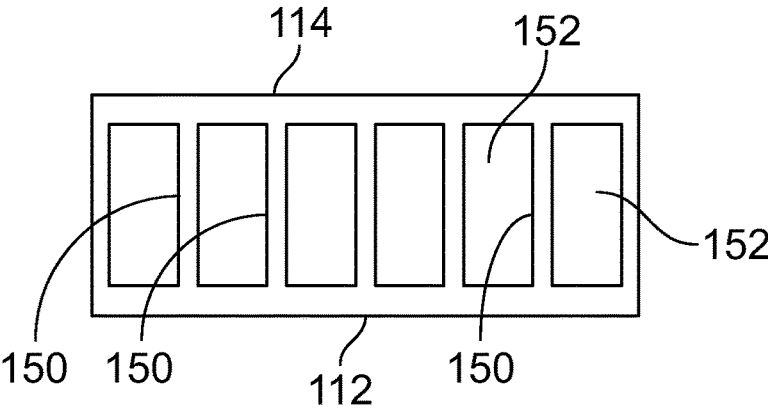
FIG. 4 illustrates a simplified internal view of a panel, according to an example of the present disclosure.

FIG. 4 illustrates a simplified internal view of a panel 108, according to an example of the present disclosure. In at least one example, the panel 108 includes a plurality of internal braces 150, such as stringers, I-beams, corrugations, and/or the like) that space the first face 112 apart from the second face 114. A plurality of internal gaps 152 are disposed between the braces 150. The braces 150 provide strength and robustness, while reducing overall weight, and desirably modifying, adjusting, or otherwise affecting flexibility. The first face 112, the second face 114 and the internal braces 150 can be integrally molded and formed as a single monolithic piece. Alternatively, the panel 108 can be formed as a single, contiguous panel without internal braces.

Figures 5, 6:
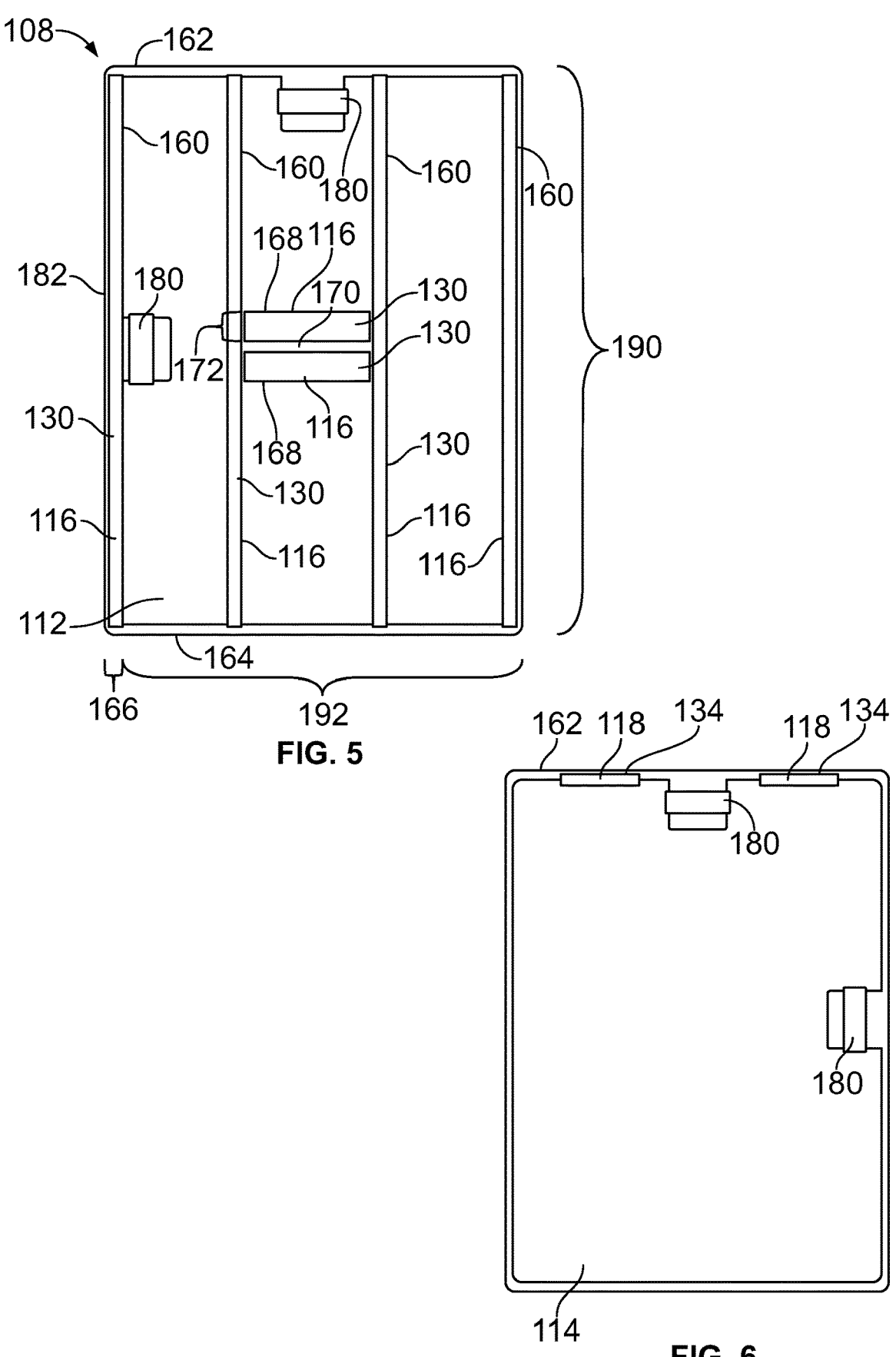
FIG. 5 illustrates a front view of a panel, according to an example of the present disclosure.
FIG. 6 illustrates rear view of the panel of FIG. 5.

FIG. 5 illustrates a front view of a panel 108, according to an example of the present disclosure. The first face 112 includes coupling members 116 in the form of loops 130. For example, vertical strips 160 of loops 130 can extend from a top edge 162 to a bottom edge 164. The vertical strips 160 have a first width 166. The coupling members 116 also include horizontal strips 168 proximate to a center 170 of the panel 108. The horizontal strips 168 have a second width 172 that differs from the first width 166. For example, the second width 172 can be greater than the first width 166. The loops 130 are configured to removably secure to hooks of second face of a different panel, for example. In at least one example, the first face 112 is configured to face toward a surface of a component. In this manner, the loops 130 may contact the surface of the component, but are unlikely to damage the surface (because the loops 130 are rounded, blunted, and softer than hooks, for example). Optionally, the first face 112 can include less or more coupling members 116 than shown. Further, the coupling members 116 can be sized and shaped differently than shown.

The panel 108 can also include one or more openings 180. For example, an opening 180 can be disposed proximate to the top edge 162, and an opening 180 can be disposed proximate to a side 182. The openings 180 provide clearance areas for an individual to grasp the panel 108. Further, the openings 180 provide clearance areas for clips 124 (shown in FIG. 1) to pass through and around. Optionally, the panel 108 may not include openings 180.

The panel 108 has a height 190 and a width 192. In at least one example, the height can be 48 inches, and the width 192 can be 32 inches. It has been found that a height of 48 inches provides protection for surfaces that can come into contact with various components and objects that are moved into and out of an internal cabin during a manufacturing process. Optionally, the height can be less or more than 48 includes, and the width can be less or more than 32 inches.

FIG. 6 illustrates rear view of the panel 108 of FIG. 5. The second face 114 includes the coupling members 118, which can include horizontal strips of hooks 134. As shown, the coupling members 118 can be disposed proximate to the top edge 162. In at least one example, the second face 114 is configured to face away from a surface of a component. In this manner, the hooks 134 are unable to contact the surface of the component, and are therefore unlikely to damage the surface. Optionally, the second face 114 can include less or more coupling members 118 than shown. Further, the coupling members 118 can be sized and shaped differently than shown.

Figures 7, 8, 9:
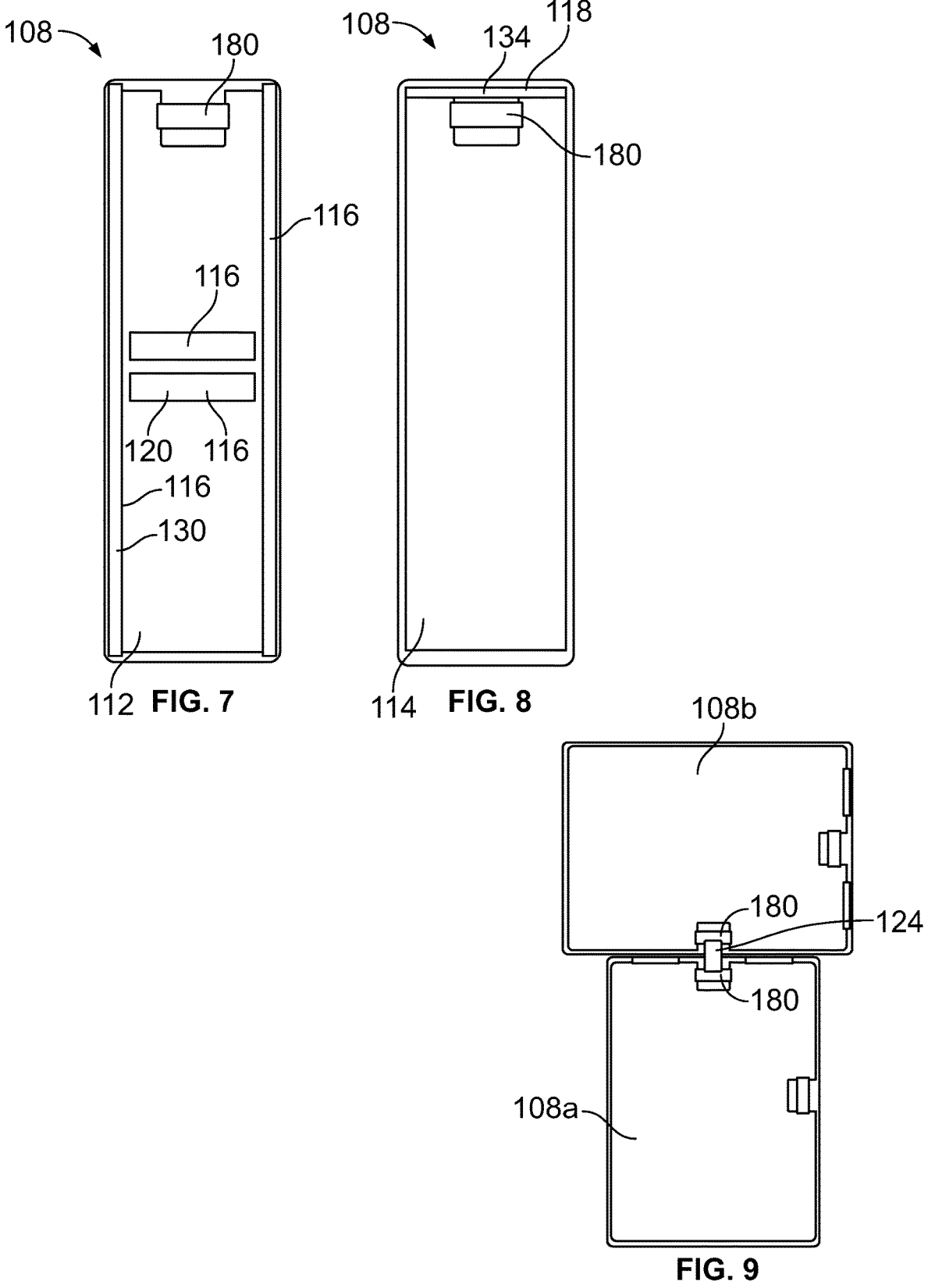
FIG. 7 illustrates a front view of a panel, according to an example of the present disclosure.
FIG. 8 illustrates rear view of the panel of FIG. 7.
FIG. 9 illustrates a rear view of panels connected together by a clip, according to an example of the present disclosure.

FIG. 7 illustrates a front view of a panel 108, according to an example of the present disclosure. FIG. 8 illustrates rear view of the panel 108 of FIG. 7. Referring to FIGS. 7 and 8, the panel 108 is sized and shaped differently than the panel 108 shown in FIGS. 5 and 6. The panel 108 of FIGS. 7 and 8 can be used in addition to, and/or in place of, the panel 108 of FIGS. 5 and 6. In at least one example, the panel 108 has a height of 48 inches, and width of 10.5 inches. Optionally, the height can be less or more than 48 includes, and the width can be less or more than 10.5 inches.

FIG. 9 illustrates a rear view of panels 108a and 108b connected together by a clip 124, according to an example of the present disclosure. The clip 124 can be C clip having flexible arms, a ratchet clip, and/or a flexible strap that loops around portions of the panels 108a and 108b through the openings 180. The clip 124 can include coupling member(s) (such as hook and loops) that removably connect together to form the loop, and/or removably secure to coupling members of the panels 108a and/or 108b.

Figures 10, 11:
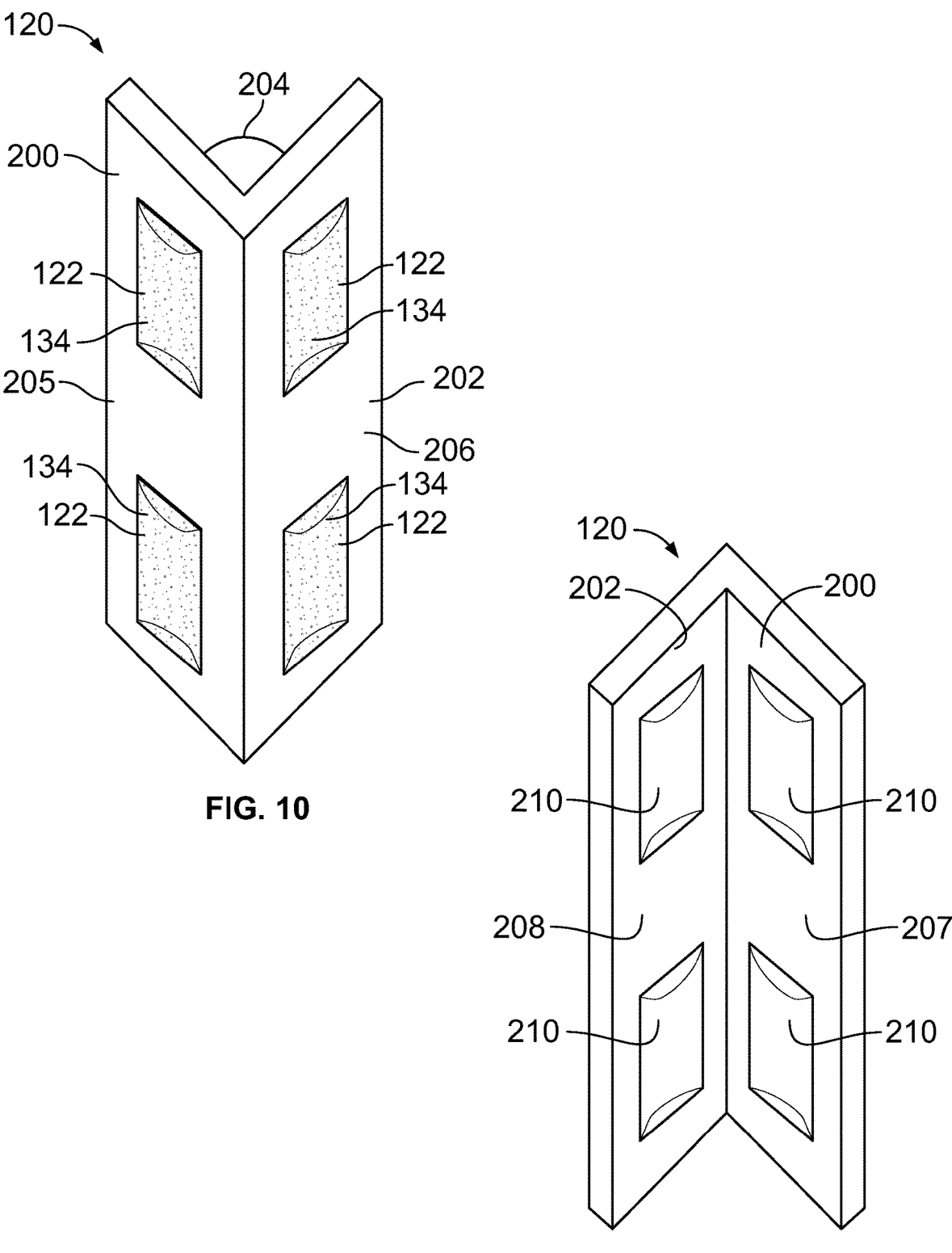
FIG. 10 illustrates an isometric external view of a corner joint, according to an example of the present disclosure.
FIG. 11 illustrates an isometric internal view of the corner joint of FIG. 10.

FIG. 10 illustrates an isometric external view of a corner joint 120, according to an example of the present disclosure. The corner joint 120 includes a first wall 200 connected to a second wall 202 at an angle 204. The angle 204 can be a right angle 204. Optionally, the angle 204 can be greater or less than 90 degrees. Outer surfaces 205 and 206 of the first wall 200 and the second wall 202, respectively, include the coupling members 122, which can include hooks 134 that are configured to removably secure to loops of the first face 112 of the panels 108. The coupling members 122 extend outwardly from the outer surfaces 205 and 206. The hooks 134 are configured to face away from a surface of a component.

FIG. 11 illustrates an isometric internal view of the corner joint 120 of FIG. 10. Inner surfaces 207 and 208 of the first wall 200 and the second wall 202, respectively, can include cushions 210 that are configured to face toward a surface of a component. The cushions 210 inwardly extend (toward a surface of a component) from the inner surfaces 207 and 208. The cushions 210 can be formed of an open or closed cell foam, for example. As another example, the cushions 210 can be formed of rubber. The cushions 210 ensure that the surfaces are not damaged by the corner joint 120, and can also provide stabilizing support to the system 100 (shown in FIG. 1) when secured to a component 102. Optionally, the corner joint 120 may not include the cushions.

Figure 12:
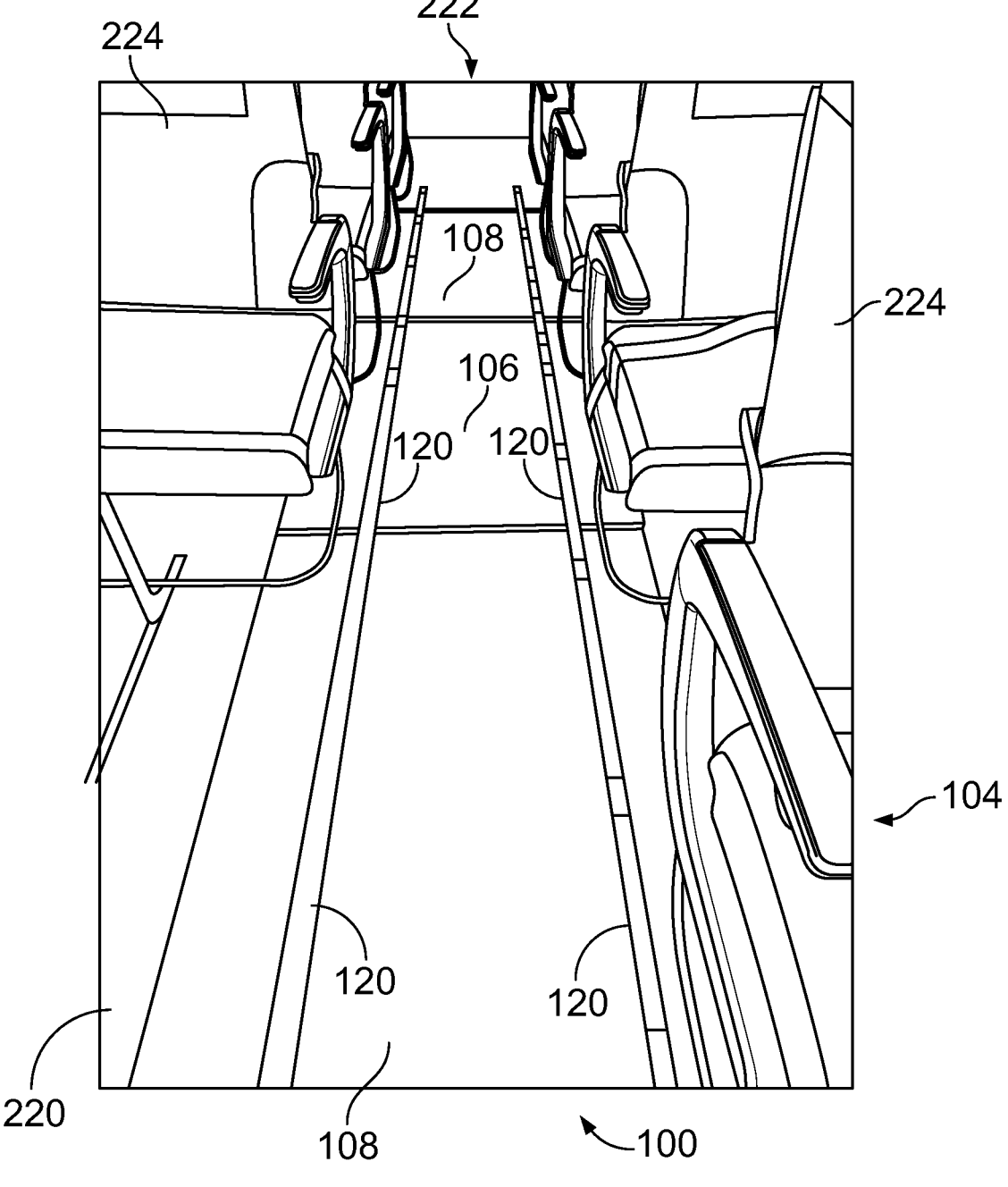
FIG. 12 illustrates a perspective view of a system secured to a floor of an internal cabin, according to an example of the present disclosure.

FIG. 12 illustrates a perspective view of a system 100 secured to a floor 220 of an internal cabin 104, according to an example of the present disclosure. The system 100 includes a plurality of panels 108 disposed over a surface of the floor 220. The panels 108 can be secured together via complementary coupling members 116 and 118 (shown in FIG. 1). The panels 108 provide a protective barrier over the floor. Additionally, corner joints 120 can be secured to the panels 108, such as through coupling members 122. The panels 108 and corners joints 120 can extend along an aisle 222 between rows of seats 224.

Figure 13:
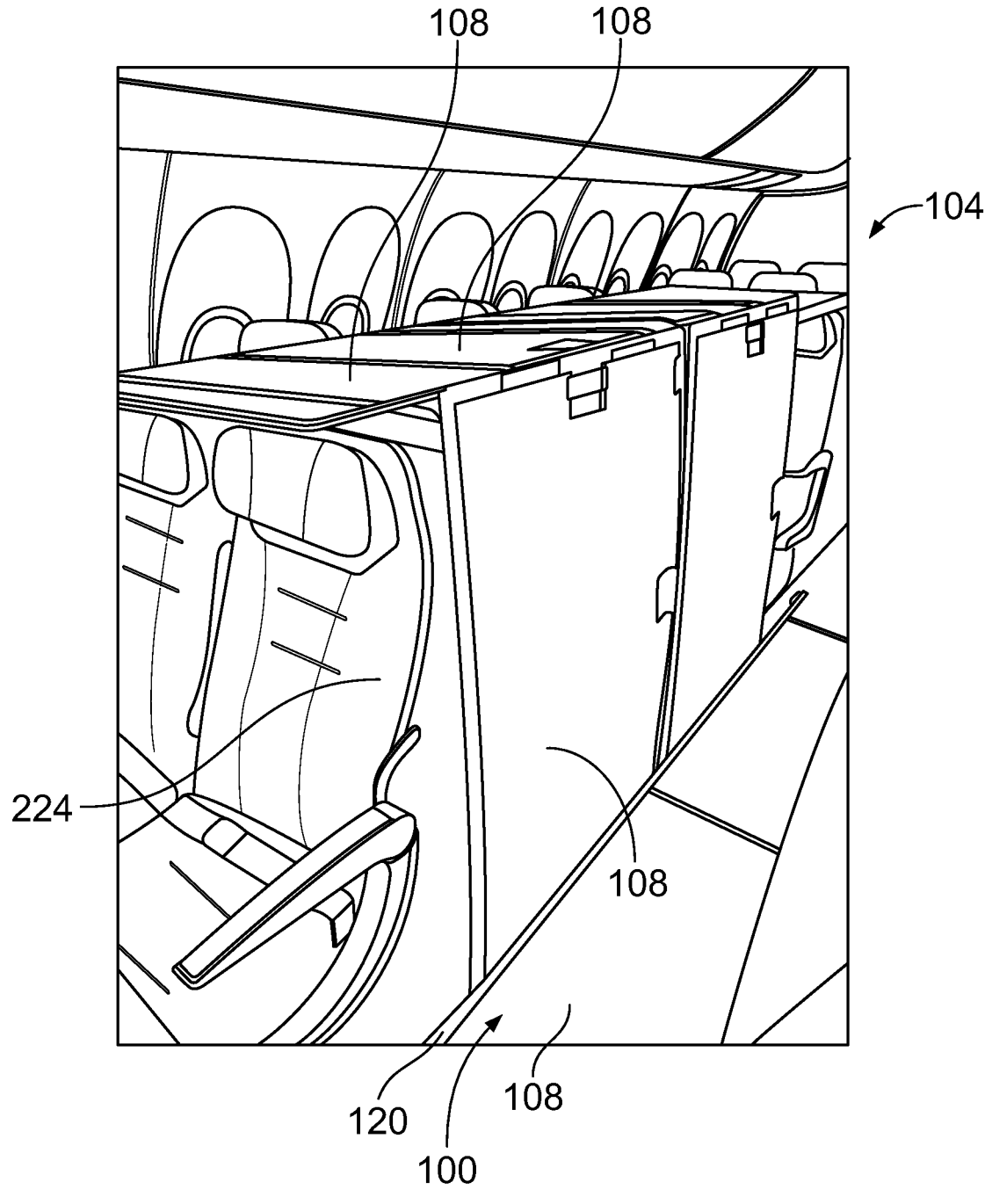
FIG. 13 illustrates a perspective view of a system secured to a floor and disposed over seats within an internal cabin, according to an example of the present disclosure.

FIG. 13 illustrates a perspective view of a system 100 secured to the floor 220 and disposed over seats 224 within the internal cabin 104, according to an example of the present disclosure. As shown, additional panels 108 can be secured to the corner joints 120 to provide vertical barriers on sides of the seats 224, and additional panels 108 can be secured to the vertical barriers to provide upper barriers over the seats 224.

Figure 14:
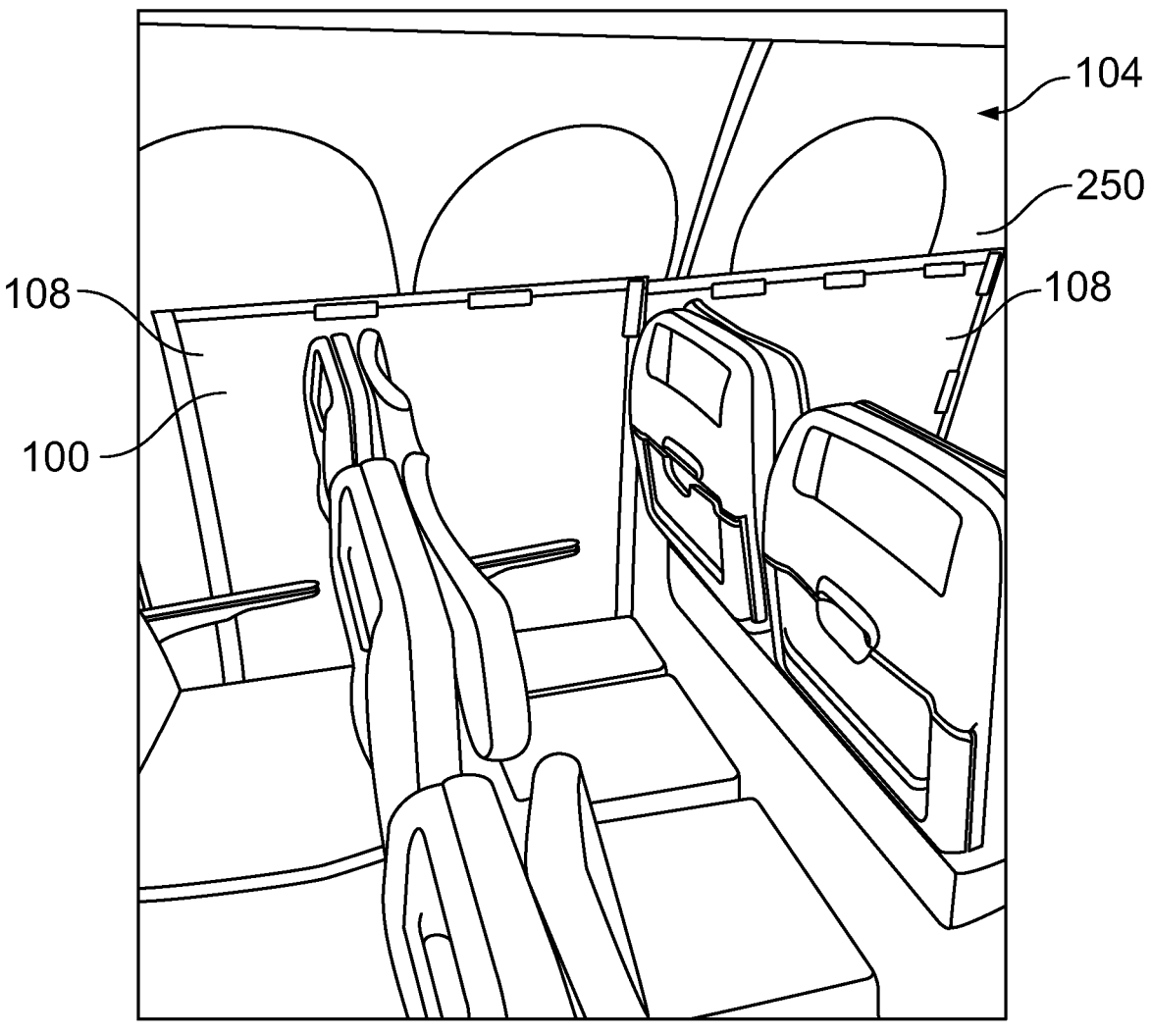
FIG. 14 illustrates a perspective view of a system secured between a side wall and seats within an internal cabin, according to an example of the present disclosure.

FIG. 14 illustrates a perspective view of a system 100 secured between a side wall 250 and seats within an internal cabin, according to an example of the present disclosure. As shown, the system 100 includes panels 108 which can conform to surfaces of the side walls 250 and provide a protective barrier thereto.

Figures 15, 16:
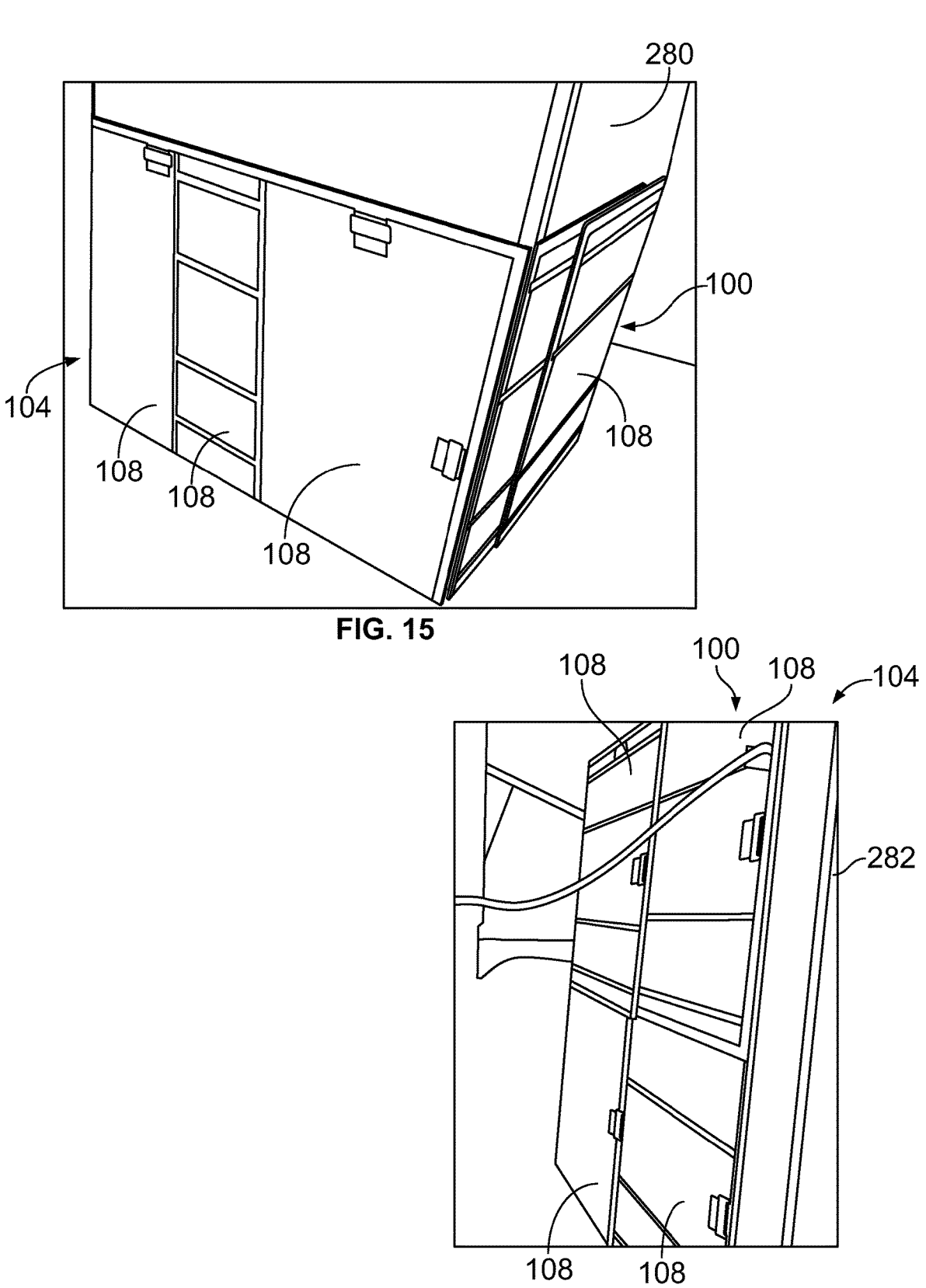
FIG. 15 illustrates a perspective view of a system secured around surfaces of a monument within an internal cabin, according to an example of the present disclosure.
FIG. 16 illustrates a perspective view of a system secured around surfaces of a monument within an internal cabin, according to an example of the present disclosure.

FIG. 15 illustrates a perspective view of a system 100 secured around surfaces of a monument 280 within an internal cabin 104, according to an example of the present disclosure. The monument 280 can be a closet, lavatory, galley, or the like. The system 100 includes a plurality of panels 108 removably secured together through complementary coupling members. The panels 108 can be laterally and/or horizontally coupled together to provide a protective barrier to surfaces of the monument 280.

FIG. 16 illustrates a perspective view of a system 100 secured around surfaces of a monument 282 within an internal cabin 104, according to an example of the present disclosure. The monument 282 can be a closet, lavatory, galley, or the like. The system 100 includes a plurality of panels 108 removably secured together through complementary coupling members. The panels 108 can be horizontally and vertically coupled together to provide a protective barrier to surfaces of the monument 280.

Figure 17:
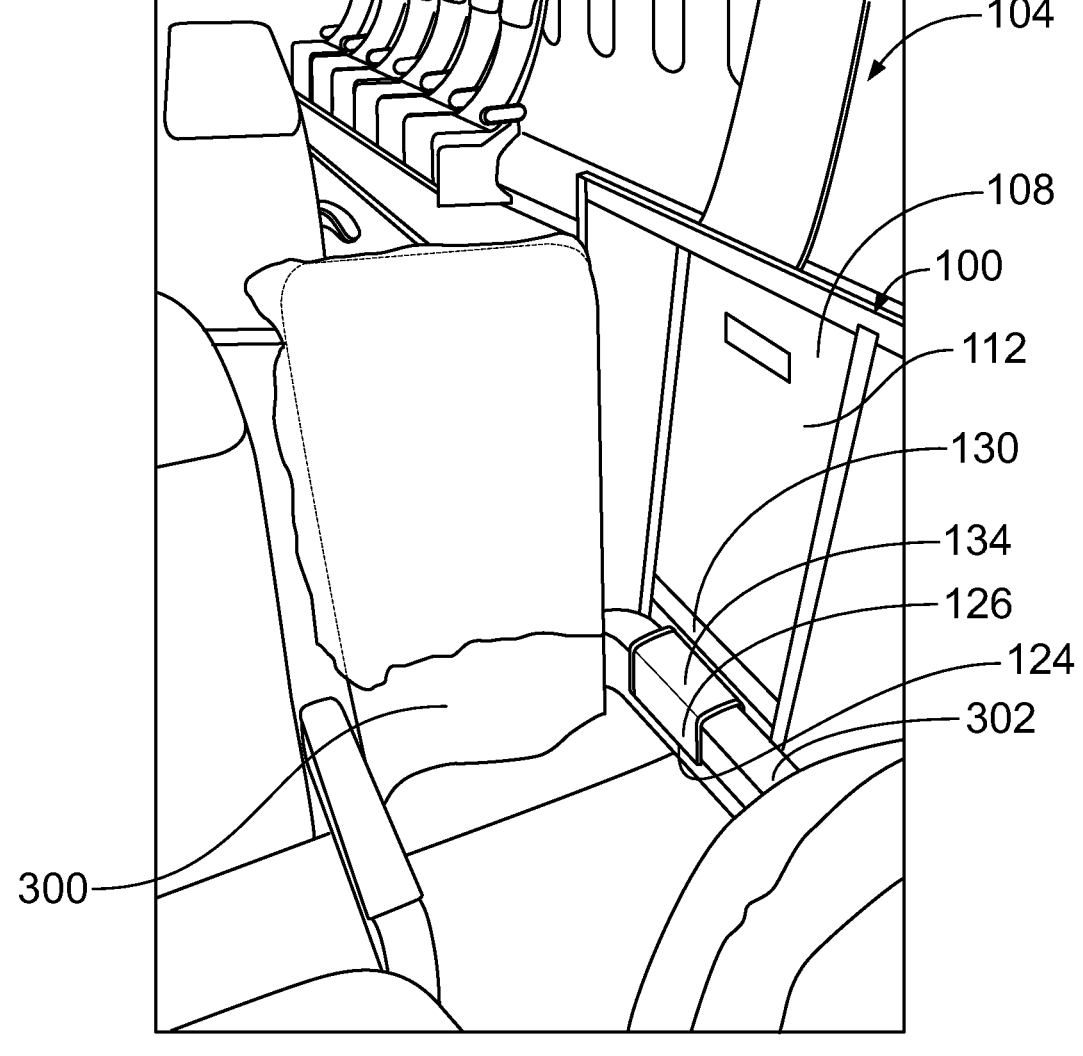
FIG. 17 illustrates a perspective view of a system secured to a seat within an internal cabin, according to an example of the present disclosure.

FIG. 17 illustrates a perspective view of a system 100 secured to a seat 300 within an internal cabin 104, according to an example of the present disclosure. A clip 124 can be a flexible sleeve that fits around a portion of an armrest 302 of the seat 300. The coupling member 126 of the clip 124 can include hooks 134 that removably couple to loops 130 of one or more coupling members 116 of a first face 112 of a panel 108.

Referring to FIGS. 1-17, the system 100 includes a plurality of modular panels 108 that can be adaptively and desirably connected together through coupling members thereof and/or coupling members of corner joints 120 and/or clips 124 to provide configurable protective barriers around various surfaces of components within an internal cabin. The panels 108 can be self-supporting in that they can be supported on a floor, instead of being hung like protective blankets. Because the panels 108 are rigid, they can be supported by a floor, and do not require being hung or held aloft with tape. Further, because the panels 108 are configured to removably secure to one another through complementary coupling members, and can be lightweight (such as when formed of polyethylene), the panels 108 can be easily stacked vertically, connected horizontally, and/or the like to accommodate components of various shapes and sizes. The systems and methods described herein are modular and provide a protective armor to components. The panels 108 are modular and compatible with one another, and can be used along with corner joints 120 and/or clips 124, as described herein. In at least one example, protective blankets can also be secured over the panels 108 to provide additional protection.

Figure 18:
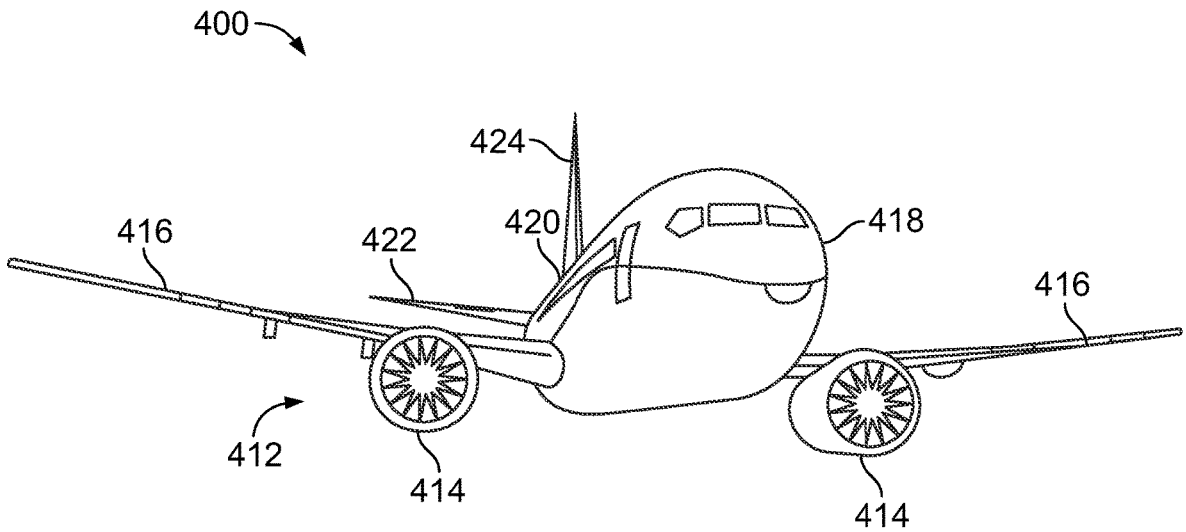
FIG. 18 illustrates a perspective front view of an aircraft, according to an example of the present disclosure.

FIG. 18 illustrates a perspective front view of an aircraft 400, according to an example of the present disclosure. The aircraft 400 is an example of the vehicle 106, shown in FIG. 1. The aircraft 400 includes a propulsion system 412 that includes engines 414, for example. Optionally, the propulsion system 412 may include more engines 414 than shown. The engines 414 are carried by wings 416 of the aircraft 400. In other examples, the engines 414 may be carried by a fuselage 418 and/or an empennage 420. The empennage 420 may also support horizontal stabilizers 422 and a vertical stabilizer 424. The fuselage 418 of the aircraft 400 defines an internal cabin 430, which includes a flight deck or cockpit, one or more work sections (for example, galleys, personnel carry-on baggage areas, and the like), one or more passenger sections (for example, first class, business class, and coach sections), one or more lavatories, and/or the like. FIG. 18 shows an example of an aircraft 400. It is to be understood that the aircraft 400 can be sized, shaped, and configured differently than shown in FIG. 18.

Further, the disclosure comprises examples according to the following clauses:

Clause 1. A system for protecting one or more surfaces of one or more components within an internal cabin of a vehicle, the system comprising:

panels configured to removably couple together in relation to the one or more surfaces of the one or more components.

Clause 2. The system of Clause 1, wherein each of the panels comprises:

a first face;

a second face opposite from the first face;

one or more first coupling members secured to the first face; and one or more second coupling members secured to the second face.

Clause 3. The system of Clause 2, wherein the one or more first coupling members comprise loops, and wherein the one or more second coupling members comprise hooks.

Clause 4. The system of Clause 3, wherein the loops are configured to face toward the one or more surfaces of the one or more components, and wherein the hooks are configured to face away from the one or more surface of the one or more components.

Clause 5. The system of any of Clauses 1-4, wherein the panels include main bodies formed of plastic.

Clause 6. The system of any of Clauses 1-4, wherein the panels include main bodies formed of polyethylene.

Clause 7. The system of any of Clauses 1-6, wherein at least two of the panels differ in one or more of size or shape.

Clause 8. The system of any of Clauses 1-7, wherein at least two of panels have different thicknesses.

Clause 9. The system of any of Clauses 1-8, wherein the panels comprise internal braces between a first face and a second face that is opposite from the first face.

Clause 10. The system of any of Clauses 1-9, further comprising corner joints configured to removably secure to each of the panels.

Clause 11. The system of Clause 10, wherein the corner joints comprise coupling members configured to removably couple to one or more complementary coupling members of the panels.

Clause 12. The system of Clause 11, wherein each of the corners joints comprises:

a first wall; and a second wall connected to the first wall at an angle, wherein the coupling members outwardly extend from outer surfaces of the first wall and the second wall.

Clause 13. The system of Clause 12, wherein cushions inwardly extend from inner surfaces of the first wall and the second wall.

Clause 14. The system of any of Clauses 1-13, further comprising clips configured to removably secure to each of the panels.

Clause 15. The system of Clause 14, wherein the clips comprise coupling members configured to removably couple to one or more complementary coupling members of the panels.

Clause 16. The system of any of Clauses 1-15, wherein the panels comprise one or more openings.

Clause 17. A method for protecting one or more surfaces of one or more components within an internal cabin of a vehicle, the method comprising:

removably coupling panels together in relation to the one or more surfaces of the one or more components.

Clause 18. The method of Clause 17, further comprising removably securing corner joints to the panels.

Clause 19. The method of Clause 18, further comprising removably securing clips configured to the panels.

Clause 20. A system for protecting one or more surfaces of one or more components within an internal cabin of a vehicle, the system comprising:

panels configured to removably couple together in relation to the one or more surfaces of the one or more components, wherein each of the panels comprises:

a first face;

a second face opposite from the first face;

one or more first coupling members secured to the first face, wherein the one or more first coupling members comprise loops, wherein the loops are configured to face toward the one or more surfaces of the one or more components; and one or more second coupling members secured to the second face, wherein the one or more second coupling members comprise hooks, wherein the hooks are configured to face away from the one or more surface of the one or more components;

corner joints configured to removably secure to each of the panels; and clips configured to removably secure to each of the panels.

As described herein, examples of the present disclosure systems and methods for protecting surfaces of components within an internal cabin of a vehicle, such as during a manufacturing process.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." More-over, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system for protecting one or more surfaces of one or more components within an internal cabin of a vehicle, the system comprising:

panels configured to removably couple together in relation to the one or more surfaces of the one or more components, wherein each of the panels is rigid and self-supporting, and wherein each of the panels comprises:

a first face;

a second face opposite from the first face; and internal braces between the first face and the second face that is opposite from the first face, wherein gaps are disposed between the braces, wherein the braces space the first face apart from the second face, and wherein the first face, the second face, and the internal braces are integrally molded and formed as a single monolithic piece; one or more first coupling members secured to the first face and one or more second coupling members secured to the second face.

2. The system of claim 1, wherein the one or more first coupling members of a particular one of the panels are incapable of coupling to the one or more second coupling members of the particular one of the panels, wherein the one or more first coupling members of the particular one of the panels are configured to couple to the one or more second coupling members of another one of the panels that differs from the particular one of the panels, and wherein the one or more second coupling members of the particular one of the panels are configured to couple to the one or more first coupling members of the another one of the panels that differs from the particular one of the panels.

3. The system of claim 2, wherein the one or more first coupling members comprise loops, and wherein the one or more second coupling members comprise hooks.

4. The system of claim 3, wherein the loops are configured to face toward the one or more surfaces of the one or more components, and wherein the hooks are configured to face away from the one or more surface of the one or more components.

5. The system of claim 1, wherein the panels include main bodies formed of plastic.

6. The system of claim 1, wherein the panels include main bodies formed of polyethylene.

7. The system of claim 1, wherein at least two of the panels differ in one or more of size or shape.

8. The system of claim 1, wherein at least two of panels have different thicknesses.

9. The system of claim 1, further comprising corner joints configured to removably secure to each of the panels.

10. The system of claim 9, wherein the corner joints comprise coupling members configured to removably couple to one or more complementary coupling members of the panels.

11. The system of claim 10, wherein each of the corners joints comprises:

a first wall; and a second wall connected to the first wall at an angle, wherein the coupling members outwardly extend from outer surfaces of the first wall and the second wall.

12. The system of claim 11, wherein cushions inwardly extend from inner surfaces of the first wall and the second wall.

13. The system of claim 1, further comprising clips configured to removably secure to each of the panels.

14. The system of claim 13, wherein the clips comprise coupling members configured to removably couple to one or more complementary coupling members of the panels.

15. The system of claim 1, wherein the panels comprise one or more openings.

16. A method for protecting one or more surfaces of one or more components within an internal cabin of a vehicle, the method comprising:

removably coupling panels together in relation to the one or more surfaces of the one or more components,

12 wherein each of the panels is rigid and self-supporting, and wherein each of the panels comprises:

a first face;

a second face opposite from the first face; and internal braces between the first face and the second face that is opposite from the first face, wherein gaps are disposed between the braces, wherein the braces space the first face apart from the second face, and wherein the first face, the second face, and the internal braces are integrally molded and formed as a single monolithic piece; one or more first coupling members secured to the first face and one or more second coupling members secured to the second face.

17. The method of claim 16, further comprising removably securing corner joints to the panels.

18. The method of claim 17, further comprising removably securing clips to the panels.

19. A system for protecting one or more surfaces of one or more components within an internal cabin of a vehicle, the system comprising:

panels configured to removably couple together in relation to the one or more surfaces of the one or more components, wherein each of the panels is rigid and self-supporting, and wherein each of the panels comprises:

a first face;

a second face opposite from the first face;

internal braces between the first face and the second face that is opposite from the first face, wherein gaps are disposed between the braces, wherein the braces space the first face apart from the second face, and wherein the first face, the second face, and the internal braces are integrally molded and formed as a single monolithic piece;

one or more first coupling members secured to the first face, wherein the one or more first coupling members comprise loops, wherein the loops are configured to face toward the one or more surfaces of the one or more components; and one or more second coupling members secured to the second face, wherein the one or more second coupling members comprise hooks, wherein the hooks are configured to face away from the one or more surface of the one or more components, wherein the one or more first coupling members of a particular one of the panels are incapable of coupling to the one or more second coupling members of the particular one of the panels, wherein the one or more first coupling members of the particular one of the panels are configured to couple to the one or more second coupling members of another one of the panels that differs from the particular one of the panels, and wherein the one or more second coupling members of the particular one of the panels are configured to couple to the one or more first coupling members of the another one of the panels that differs from the particular one of the panels;

corner joints configured to removably secure to each of the panels; and clips configured to removably secure to each of the panels.

* * * * *